Patented Oct. 4, 1932

1,880,975

UNITED STATES PATENT OFFICE

ALEXANDER A. NIKITIN, OF PASSAIC, NEW JERSEY, ASSIGNOR TO THE NAUGATUCK CHEMICAL COMPANY, OF NAUGATUCK, CONNECTICUT, A CORPORATION OF CONNECTICUT

TREATMENT OF LATEX

No Drawing.    Application filed April 16, 1929.    Serial No. 355,676.

This invention relates to improvements in the creaming of latex of rubber and similar materials, more particularly to a method of controlling the creaming of such latices.

It is known that there are a number of substances which when added to latex, will cause the latex to cream, that is, to separate into two distinct layers, one of which contains the major portion of the rubber hydrocarbon while the other contains the larger part of non-rubber ingredients. Among these creaming agents may be mentioned such as Irish moss, Karaya gum, tragacanth gum, pectin, pectin-allied bodies, ammonium alginate etc. The degree of creaming, concentration of solids, viscosity etc. depends a good deal on the nature and amount of creaming agent used, but even with all precautions, the final result will not correspond to that desired. It seems that the creaming action continues even after a period of standing to allow separation. This disadvantage can be best illustrated with ammonium alginate as the creaming agent. Ammonium alginate is very useful in obtaining a high concentration of total solids in the cream, but if the cream so prepared is allowed to stand, or diluted, as is sometimes the case for the proper preparation of a latex compound,—creaming continues. For instance in the preparation of quick depositing gloves on porous forms from such a creamed latex the creamed latex in continuing to cream, forms a very concentrated layer at the surface which produces thin coagulum, and consequently less concentrated layer at the bottom of the vessel with the result of a non-uniform dipped product.

It has been found that certain substances will avoid this troublesome feature and they are designated negative or anti-creaming agents. Saponin is the best illustration of this class.

Accordingly the invention comprises adding the anti-creaming agent to the latex subsequent to creaming. Further creaming is thereby avoided. By this means it is possible to cream a latex to any desired concentration without difficulty. In other words concentration of 40, 45, 50, 55, 60 percent of total solids in the cream can be attained at will. No stirring, shaking or agitation of the vessel containing the latex, thus causing introduction of air bubbles, will be necessary.

*Example 1.*—To 1000 grams of ammonia preserved latex, is added .72 gram ammonium alginate; when a cream of a solids concentration of 50% is reached, there is added to the cream about 1 part of saponin per 100 parts of solids in the cream, after the serum is removed. Further creaming is retarded.

Although the amount of anti-creaming agent may be reasonably varied, in general the best results are obtained with substantially ½–3 parts per 100 parts of solids, of the negative creaming agent.

With the detailed disclosure above given it is obvious that modifications will suggest themselves and it is not desired to limit the invention otherwise than as set forth in the appended claims.

Having thus described my invention, what I claim and desire to protect by Letters Patent is:

1. A method of controlling the creaming of latex which comprises treating latex with ammonium alginate, allowing the mixture to cream, removing the watery serum portion, and adding an anti-creaming agent to the creamed latex.

2. The method of controlling the creaming of latex which comprises treating latex with ammonium alginate, allowing the mixture to cream, removing the watery serum portion, and adding saponin to the creamed latex.

3. A method of controlling the creaming of latex which comprises treating latex with ammonium alginate, allowing the mixture to cream, removing the watery serum portion, and adding to the creamed latex substantially ½-3 parts of saponin per 100 parts of solids.

4. A method of controlling the creaming of latex which comprises treating latex with ammonium alginate, allowing the mixture to cream, removing the watery serum portion, and adding to the creamed latex about 1 part of saponin, per 100 parts of solids.

Signed at Passaic, county of Passaic, State of New Jersey, this 12 day of April, 1929.

ALEXANDER A. NIKITIN.